US008934015B1

(12) United States Patent  
Chi et al.

(10) Patent No.: US 8,934,015 B1
(45) Date of Patent: Jan. 13, 2015

(54) EXPERIENCE SHARING

(75) Inventors: Liang-Yu Tom Chi, San Francisco, CA (US); Steven John Lee, San Francisco, CA (US); Indika Charles Mendis, Mountain View, CA (US); Max Benjamin Braun, San Francisco, CA (US); Luis Ricardo Prada Gomez, Hayward, CA (US)

(73) Assignee: Google Inc., Mountain View, CA (US)

( * ) Notice: Subject to any disclaimer, the term of this patent is extended or adjusted under 35 U.S.C. 154(b) by 325 days.

(21) Appl. No.: 13/314,180

(22) Filed: Dec. 8, 2011

Related U.S. Application Data

(60) Provisional application No. 61/510,020, filed on Jul. 20, 2011.

(51) Int. Cl.
G06F 17/30 (2006.01)
(52) U.S. Cl.
USPC .............................................. 348/158; 348/61
(58) Field of Classification Search
None
See application file for complete search history.

(56) References Cited

U.S. PATENT DOCUMENTS

| 6,452,572 | B1 * | 9/2002 | Fan et al. ........................... 345/8 |
|---|---|---|---|
| 7,192,136 | B2 | 3/2007 | Howell et al. |
| 7,255,437 | B2 | 8/2007 | Howell et al. |
| 7,380,936 | B2 | 6/2008 | Howell et al. |
| 7,401,918 | B2 | 7/2008 | Howell et al. |
| 7,438,410 | B1 | 10/2008 | Howell et al. |
| 7,481,531 | B2 | 1/2009 | Howell et al. |
| 7,500,746 | B1 | 3/2009 | Howell et al. |
| 7,500,747 | B2 | 3/2009 | Howell et al. |
| 7,543,934 | B2 | 6/2009 | Howell et al. |
| 7,546,352 | B1 | 6/2009 | Bhattiprolu et al. |
| 7,581,833 | B2 | 9/2009 | Howell et al. |
| 7,621,634 | B2 | 11/2009 | Howell et al. |
| 7,677,723 | B2 | 3/2010 | Howell et al. |
| 7,683,937 | B1 | 3/2010 | Blumenfeld |
| 7,711,961 | B2 | 5/2010 | Fujinuma et al. |
| 7,742,184 | B2 | 6/2010 | Seki et al. |
| 7,760,898 | B2 | 7/2010 | Howell et al. |
| 7,771,046 | B2 | 8/2010 | Howell et al. |
| 7,792,552 | B2 | 9/2010 | Thomas et al. |
| 7,806,525 | B2 | 10/2010 | Howell et al. |
| 7,922,321 | B2 | 4/2011 | Howell et al. |

(Continued)

FOREIGN PATENT DOCUMENTS

| WO | 2009052618 | 4/2009 |
|---|---|---|
| WO | 2010007612 | 1/2010 |

OTHER PUBLICATIONS

Martin, Reed, et al., neXtream: A Multi-Device, Social Approach to Video Content Consumption, MIT Media Lab, IEEE, 2010.

(Continued)

Primary Examiner — Sath V Perungavoor
Assistant Examiner — Janese Duley
(74) Attorney, Agent, or Firm — McDonnell Boehnen Hulbert & Berghoff LLP

(57) ABSTRACT

Disclosed are methods and apparatus for experience sharing for emergency situations. A wearable computing device can receive an indication of an emergency situation. In response to the indication, the wearable computing device can initiate an experience sharing session with one or more emergency contacts. During the experience sharing session, the wearable computing device can capture video data, add text to the captured video data, and transmit the captured video data and added text to the one or more emergency contacts.

24 Claims, 11 Drawing Sheets

(56) References Cited

U.S. PATENT DOCUMENTS

| | | |
|---|---|---|
| 8,109,629 B2 | 2/2012 | Howell et al. |
| 2005/0138560 A1 | 6/2005 | Lee et al. |
| 2005/0266884 A1 | 12/2005 | Marriott et al. |
| 2006/0098088 A1* | 5/2006 | Raghunath ............... 348/61 |
| 2006/0132382 A1 | 6/2006 | Jannard |
| 2008/0023002 A1 | 1/2008 | Guelzow et al. |
| 2008/0103877 A1 | 5/2008 | Gerken |
| 2008/0134235 A1 | 6/2008 | Kalaboukis |
| 2008/0270541 A1 | 10/2008 | Keener et al. |
| 2009/0013263 A1 | 1/2009 | Fortnow et al. |
| 2009/0157816 A1 | 6/2009 | Pattan |
| 2009/0171902 A1* | 7/2009 | MacLaurin et al. ............. 707/3 |
| 2009/0177679 A1* | 7/2009 | Boomer et al. ............. 707/102 |
| 2009/0215477 A1 | 8/2009 | Lee et al. |
| 2009/0216435 A1* | 8/2009 | Zheng et al. ............. 701/209 |
| 2009/0219166 A1* | 9/2009 | MacFarlane et al. ...... 340/691.4 |
| 2010/0020229 A1 | 1/2010 | Hershey et al. |
| 2010/0082759 A1 | 4/2010 | Nalliah et al. |
| 2010/0125531 A1 | 5/2010 | Wong |
| 2010/0161635 A1 | 6/2010 | Dey |
| 2010/0199340 A1 | 8/2010 | Jonas et al. |
| 2011/0035453 A1 | 2/2011 | Koul et al. |
| 2011/0055046 A1 | 3/2011 | Bowen et al. |
| 2011/0096168 A1 | 4/2011 | Siann et al. |
| 2011/0107220 A1 | 5/2011 | Perlman |
| 2011/0140913 A1 | 6/2011 | Montenero |
| 2011/0221657 A1* | 9/2011 | Haddick et al. ................... 345/8 |
| 2011/0246421 A1 | 10/2011 | Takahashi |
| 2012/0056972 A1 | 3/2012 | Benedeki et al. |
| 2012/0166453 A1 | 6/2012 | Broder |
| 2012/0173582 A1* | 7/2012 | Stevens ..................... 707/782 |
| 2012/0182384 A1 | 7/2012 | Anderson et al. |
| 2012/0206335 A1* | 8/2012 | Osterhout et al. ............ 345/156 |
| 2012/0225633 A1* | 9/2012 | Nichols ...................... 455/404.1 |
| 2012/0320013 A1* | 12/2012 | Perez et al. ................... 345/207 |

OTHER PUBLICATIONS

Cesar, Pablo, Enhancing Social Sharing of Videos: Fragment, Annotate, Enrich, and Share, ACM, Oct. 2008.

Wikimedia Foundation Inc., Ustream, Nov. 17, 2011 available online at http://en.wikipedia.org/wiki/Ustream (last visited Dec. 6, 2011).

Heater, Brian, Color for Facebook iPhone App Hands-On, available online at http://www.engadget.com/2011/12/01/color-for-facebook-iphone-app-hands-on/ (last visited Dec. 6, 2011).

* cited by examiner

EXPERIENCE SHARING

CROSS REFERENCE TO RELATED APPLICATIONS

This application claims priority to U.S. Patent App. No. 61/510,020, filed Jul. 20, 2011, entitled "Experience Sharing", the contents of which are incorporated by reference herein for all purposes.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mounted displays" (HMDs). A head-mounted display places a graphic display or displays close to one or both eyes of a wearer. To generate the images on a display, a computer processing system may be used. Such displays may occupy a wearer's entire field of view, or only occupy part of wearer's field of view. Further, head-mounted displays may be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming.

SUMMARY

In one aspect, a method is provided. An indication of an emergency situation is received at a wearable computing device. In response to the indication, an experience sharing session with one or more emergency contacts is initiated by the wearable computing device. During the experience sharing session, the wearable computing device: captures video data, adds text to the captured video data, and transmits the captured video data and added text to the one or more emergency contacts.

In a second aspect, a wearable computing device is provided. The wearable computing device includes a processor and memory. The memory has one or more instructions that, in response to execution by the processor, cause the wearable computing device to perform functions. The functions include: (a) receive an indication of an emergency situation; (b) in response to the indication, initiate an experience sharing session with one or more emergency contacts using the wireless transceiver, and (c) during the experience sharing session, capture video data via the camera, add text to the captured video data, and transmit the captured video data and added text to the one or more emergency contacts using the wireless transceiver.

In a third aspect, an article of manufacture is provided. The article of manufacture includes a computer-readable storage medium having instructions stored thereon that, in response to execution by a processor, cause the processor to perform operations. The instructions include: (a) instructions for receiving an indication of an emergency situation, (b) instructions for, in response to the indication, initiating an experience sharing session with one or more emergency contacts, and (c) instructions for, during the experience sharing session, capturing video data, adding text to the captured video data, and transmitting the captured video data and added text to the one or more emergency contacts.

In a fourth aspect, an apparatus is provided. The apparatus includes: (a) means for receiving an indication of an emergency situation, (b) means for, in response to the indication, initiating an experience sharing session with one or more emergency contacts, and (c) means for, during the experience sharing session, capturing video data, adding text to the captured video data, and transmitting the captured video data and added text to the one or more emergency contacts.

These as well as other aspects, advantages, and alternatives, will become apparent to those of ordinary skill in the art by reading the following detailed description, with reference where appropriate to the accompanying drawings.

DETAILED DESCRIPTION

Figure 1:
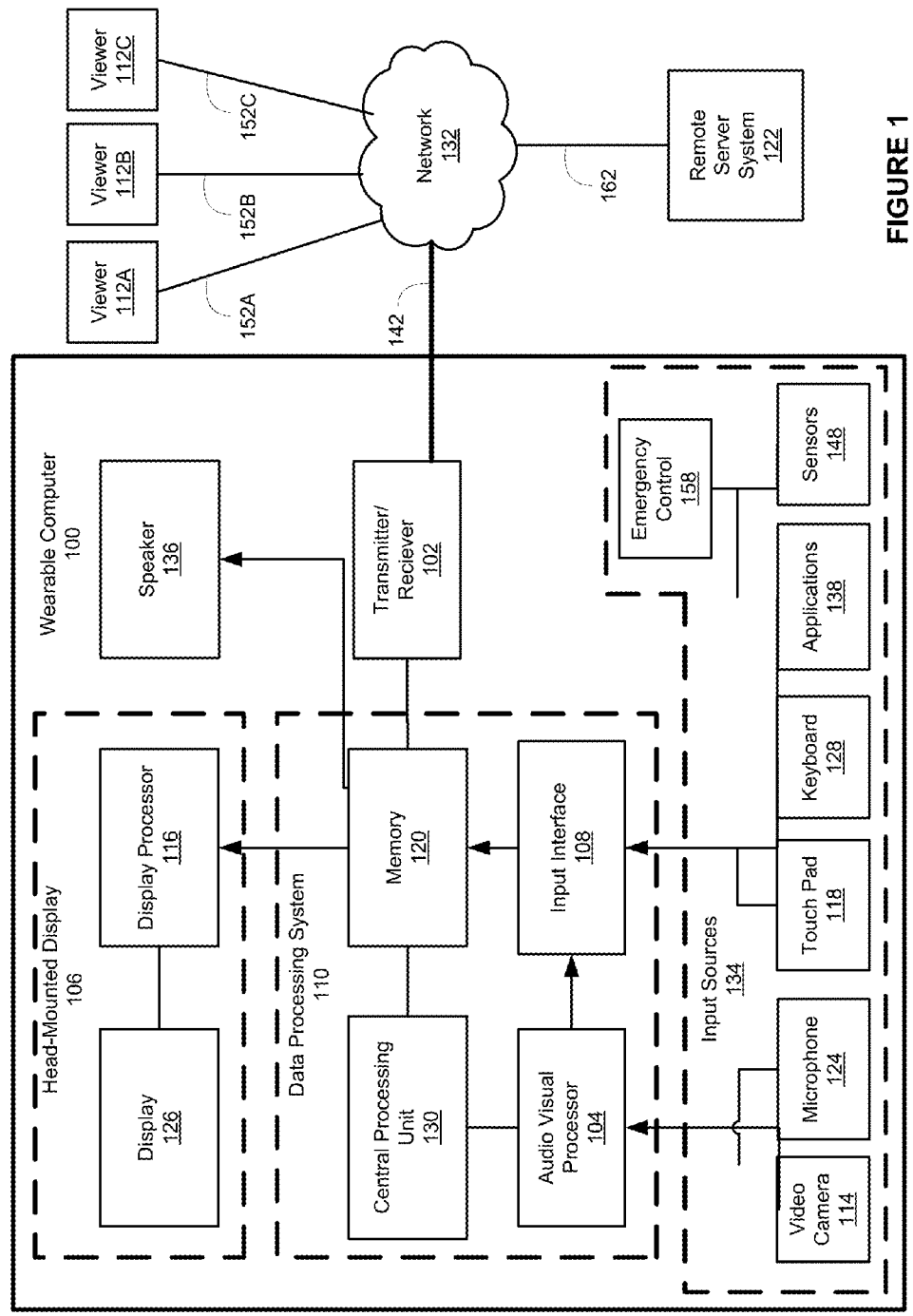
FIG. 1 depicts a distributed computing architecture in accordance with an example embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

General Overview of Experience Sharing

Experience sharing generally involves a user sharing media that captures their experience with one or more other users. In an exemplary embodiment, a user may use a wearable computing device or another computing device to capture media that conveys the world as they are experiencing it, and then transmit this media to others in order to share their experience. For example, in an experience-sharing session (ESS), a user may share a point-of-view video feed captured by a video camera on a head-mounted display of their wearable computer, along with a real-time audio feed from a microphone of their wearable computer. Many other examples are possible as well.

In an experience-sharing session, the computing device that is sharing a user's experience may be referred to as a "sharing device" or a "sharer," while the computing device or devices that are receiving real-time media from the sharer may each be referred to as a "viewing device" or a "viewer." Additionally, the content that is shared by the sharing device during an experience-sharing session may be referred to as a "share." Further, a computing system that supports an experience-sharing session between a sharer and one or more viewers may be referred to as a "server", an "ES server," "server system," or "supporting server system."

In some exemplary methods, the sharer may transmit a share in real time to the viewer, allowing the experience to be portrayed as it occurs. In this case, the sharer may also receive and present comments from the viewers. For example, a sharer may share the experience of navigating a hedge maze while receiving help or criticism from viewers. In another embodiment, the server may store a share so that new or original viewers may access the share outside of real time.

A share may include a single type of media content (i.e., a single modality of media), or may include multiple types of media content (i.e., multiple modalities of media). In either case, a share may include a video feed, a three-dimensional (3D) video feed (e.g., video created by two cameras that is combined to create 3D video), an audio feed, a text-based feed, an application-generated feed, and/or other types of media content.

Further, in some embodiments a share may include multiple instances of the same type of media content. For example, in some embodiments, a share may include two or more video feeds. For instance, a share could include a first video feed from a forward-facing camera on a head-mounted display (HMD), and a second video feed from a camera on the HMD that is facing inward towards the wearer's face. As another example, a share could include multiple audio feeds for stereo audio or spatially-localized audio providing surround sound.

In some implementations, a server may allow a viewer to participate in a voice chat that is associated with the experience-sharing session in which they are a viewer. For example, a server may support a voice chat feature that allows viewers and/or the sharer in an experience-sharing session to enter an associated voice-chat session. The viewers and/or the sharer who participate in a voice-chat session may be provided with a real-time audio connection with one another, so that each of those devices can play out the audio from all the other devices in the session. In an exemplary embodiment, the serving system supporting the voice-chat session may sum or mix the audio feeds from all participating viewers and/or the sharer into a combined audio feed that is output to all the participating devices. Further, in such an embodiment, signal processing may be used to minimize noise when audio is not received from a participating device (e.g., when the user of that device is not speaking). Further, when a participant exits the chat room, that participant's audio connection may be disabled. (Note however, that they may still participate in the associated experience-sharing session.) This configuration may help to create the perception of an open audio communication channel.

In a further aspect, a server could also support a video-chat feature that is associated with an experience-sharing session. For example, some or all of the participants in a video chat could stream a low-resolution video feed. As such, participants in the video chat may be provided with a view of a number of these low-resolution video feeds on the same screen as the video from a sharer, along with a combined audio feed as described above. For instance, low-resolution video feeds from viewers and/or the sharer could be displayed to a participating viewer. Alternatively, the supporting server may determine when a certain participating device is transmitting speech from its user, and update which video or videos are displayed based on which participants are transmitting speech at the given point in time.

In either scenario above, and possibly in other scenarios, viewer video feeds may be formatted to capture the users themselves, so that the users can be seen as they speak. Further, the video from a given viewer or the sharer may be processed to include a text caption including, for example, the name of a given device's user or the location of device. Other processing may also be applied to video feeds in a video chat session.

In some embodiments, a video chat session may be established that rotates the role of sharer between different participating devices (with those devices that are not designated as the sharer at a given point in time acting as a viewer.) For example, when a number of wearable computers are involved in a rotating-sharer experience-sharing session, the supporting server system may analyze audio feeds from the participating wearable computers to determine which wearable computer is transmitting audio including the associated user's speech. Accordingly, the server system may select the video from this wearable computer and transmit the video to all the other participating wearable computers. The wearable computer may be de-selected when it is determined that speech is no longer being received from it. Alternatively, the wearable computer may be de-selected after waiting for a predetermined amount of time after it ceases transmission of speech.

In a further aspect, the video from some or all the wearable computers that participate in such a video chat session may capture the experience of the user that is wearing the respective wearable computer. Therefore, when a given wearable computer is selected, this wearable computer is acting as the sharer in the experience-sharing session, and all the other wearable computers are acting as viewers. Thus, as different wearable computers are selected, the role of the sharer in the experience-sharing session is passed between these wearable computers. In this scenario, the sharer in the experience-sharing session is updated such that the user who is speaking at a given point in time is sharing what they are seeing with the other users in the session.

In a variation on the above-described video-chat application, when multiple participants are acting a sharers and transmitting a share, individual viewers may be able to select which share they receive, such that different viewers may be concurrently receiving different shares.

In another variation on the above-described video-chat application, the experience-sharing session may have a "directing viewer" that may select which shares or shares will be displayed at any given time. This variation may be particularly useful in an application of a multi-sharer experience-sharing session, in which a number of viewers are all transmitting a share related to a certain event. For instance, each member of a football team could be equipped with a helmet-mounted camera. As such, all members of the team could act as sharers in a multi-sharer experience-sharing session by transmitting a real-time video feed from their respective helmet-mounted cameras. A directing viewer, could then select which video feeds to display at a given time. For example, at a given point in time, the directing viewer might select a video feed or feeds from a member or members that are involved in a play that is currently taking place.

In a further aspect of such an embodiment, the supporting server system may be configured to resolve conflicts if multiple devices transmit speech from their users simultaneously. Alternatively, the experience-sharing session interface for participants may be configured to display multiple video feeds at once (i.e., to create multiple simultaneous sharers in the experience-sharing session). For instance, if speech is received from multiple participating devices at once, a participating device may divide its display to show the video feeds from some or all of the devices from which speech is simultaneously received.

In a further aspect, a device that participates in an experience-sharing session, may store the share or portions of the share for future reference. For example, in a video-chat implementation, a participating device and/or a supporting server system may store the video and/or audio that is shared during the experience-sharing session. As another example, in a video-chat or voice-chat session, a participating device and/or a supporting server system may store a transcript of the audio from the session.

Emergency-Related Experience-Sharing Sessions

Experience sharing sessions can be used to communicate various experiences, and thus may be useful in various emergency situations. At the onset of or during an emergency situation, a user of a wearable computing device can initiate an experience sharing session with one or more emergency contacts when an emergency situation is indicated.

The one or more emergency contacts can include a public emergency services provider, such as a 911 call center, a police department, a fire department, and/or an ambulance service, among others. Alternatively or additionally, the one or more emergency contacts could include a private emergency contact or contacts such as a parent, caregiver, and/or friend. When the experience sharing session is established, the emergency contacts may be able to see and/or hear what is occurring in the vicinity of the wearable computing device.

An emergency contact may also receive a location of the wearable computing device, for example, a location determined by a location sensor, such as a GPS receiver, in the wearable computing device.

Other emergency situations can be avoided by use of experience sharing session. For example, an adult guardian can use an experience sharing session to watch persons who may be particularly fragile in an emergency situation, such as children, the ill, home-bound persons, and the differently-abled.

Exemplary ESS System Architecture

FIG. 1 is a simplified diagram of a sharing device, according to an exemplary embodiment. In particular, FIG. 1 shows a wearable computer 100 that is configured to serve as the sharer in an experience-sharing session. It should be understood, however, that other types of computing devices may be configured to provide similar sharing-device functions and/or may include similar components as those described in reference to wearable computer 100, without departing from the scope of the invention.

As shown, wearable computer 100 includes a head-mounted display (HMD) 106, several input sources 134, a data processing system 110, and a transmitter/receiver 102. FIG. 1 also indicates that a communicative link 142 could be established between the wearable computer 100 and a network 132. Further, the network 132 could connect to one or more viewers 112A, 112B, and 112C and a server 122 and through additional respective connections 152A, 152B, 152C, and 162.

An exemplary set of input sources 134 may include: a video camera 114, a microphone 124, a touch pad 118, a keyboard 128, one or more applications 138, other general sensors 148 (e.g. biometric and/or location sensors), and an emergency control 158. The input sources 134 may be internal, as shown in FIG. 1, or the input sources 134 may be in part or entirely external. Additionally, the input sources 134 shown in FIG. 1 should not be considered exhaustive, necessary, or inseparable. Exemplary embodiments may exclude any of the exemplary set of input devices 134 and/or include one or more additional input devices that may add to an experience-sharing session As mentioned above, general sensors 148 can include one or more location sensors. A location sensor can utilize one or more technologies and sensors to determine and provide a location of wearable computer 100. Example technologies include, but are not limited to, Global Positioning System (GPS) technologies and sensors, other satellite-based technologies and sensors, inertial navigation technologies, timing circuitry, accelerometers, compasses, velocity sensors, and gyroscopes. In some embodiments, the location sensor(s) can determine and provide related information to wearable computer 100, such as velocity including both speed and direction(s) of travel, acceleration, distance(s) traveled, and timing information. Many other types of information related to location(s) are possible as well.

In some embodiments, such as shown in FIG. 1, an emergency control 158 can be used to indicate an emergency. Emergency control 158 can be one or more buttons, switches, levers, and/or controls that, when pressed or moved appropriately by a wearer of wearable computer 100 or another person, indicate an emergency condition. In particular embodiments, multiple buttons, switches, levers, and/or controls may have to be pressed or moved appropriately in a simultaneous or near simultaneous fashion to indicate the emergency condition. The use of multiple buttons, etc. pressed or moved simultaneously can reduce a likelihood of a false indication of the emergency condition. Other emergency controls are possible as well.

In other embodiments, wearable computer 100 can determine and/or indicate that the emergency situation exists using other sensors, or perhaps additional sensors to biometric indication sensors, such as microphone(s), video camera(s), touch pad(s), keyboard(s), and/or other sensors. For example, wearable computer 100 can infer that the emergency situation exists based on detected sounds and/or utterances, such as sounds/utterances related to accidents or vehicle crashes, sounds above a threshold decibel level, utterances with words such as "Help" or "Call the police!", and so on. As another example, wearable computer 100 can infer that the emergency situation exists based on detected images, such as images of accidents, explosions, falling people, and so on. Many other examples of wearable computer 100 automatically determining and/or indicating emergency situations are possible as well.

The exemplary data processing system 110 may include a memory system 120, a central processing unit (CPU) 130, an input interface 108, and an audio visual (A/V) processor 104. The memory system 120 may be configured to receive data from the input sources 134 and/or the transmitter/receiver 102. The memory system 120 may also be configured to store received data and then distribute the received data to the CPU 130, the HMD 106, a set of one or more speakers 136, or to a remote device through the transmitter/receiver 102. The CPU 130 may be configured to detect a stream of data in the memory system 120 and control how the memory system distributes the stream of data.

The input interface 108 may be configured to process a stream of data from the input sources 134 and then transmit the processed stream of data into the memory system 120. This processing of the stream of data may convert a raw signal, coming directly from the input sources 134 or A/V processor 104, into a stream of data that other elements in the wearable computer 100, the viewers 112, and the server 122 can use. The A/V processor 104 may be configured perform audio and visual processing on one or more audio feeds from one or more microphones 124 and on one or more video feeds from one or more video cameras 114. The CPU 130 may be configured to control the audio and visual processing performed on the one or more audio feeds and the one or more video feeds. Examples of audio and video processing techniques, which may be performed by the A/V processor 104, will be given later.

The transmitter/receiver 102 may be configured to communicate with one or more remote devices through the communication network 132. Each connection made to the network (142, 152A, 152B, 152C, and 162) may be configured to support two-way communication and may be wired or wireless.

The HMD 106 may be configured to display visual objects derived from many types of visual multimedia, including video, text, graphics, pictures, application interfaces, and animations. In some embodiments, one or more speakers 136 may also present audio objects. Some embodiments of HMD 106 may include display processor 116 that is configured to store and transmit a visual object to display 126 configured to visually display the visual object. The display processor 116 may also edit the visual object for a variety of purposes. One purpose for editing a visual object may be to synchronize a display of the visual object by display 126 with a presentation of an audio object by the one or more speakers 136. Another purpose for editing a visual object may be to compress the visual object to reduce load on the display. Still another purpose for editing a visual object may be to correlate displaying of the visual object with other visual objects currently displayed by the HMD 106.

While FIG. 1 illustrates a wearable computer configured to act as sharing device, it should be understood that a sharing device may take other forms. For example, a sharing device may be a mobile phone, a tablet computer, a personal computer, or any other computing device configured to provide the sharing device functionality described herein.

In general, it should be understood that any computing system or device described herein may include or have access to memory or data storage, which may take include a non-transitory computer-readable medium having program instructions stored thereon. Additionally, any computing system or device described herein may include or have access to one or more processors. As such, the program instructions stored on such a non-transitory computer-readable medium may be executable by at least one processor to carry out the functionality described herein.

Further, while not discussed in detail, it should be understood that the components of a computing device that serves as a viewing device in an experience-sharing session may be similar to those of a computing device that serves as a sharing device in an experience-sharing session. Further, a viewing device may take the form of any type of networked device capable of providing a media experience (e.g., audio and/or video), such as television, a game console, and/or a home theater system, among others.

Exemplary Device Configurations

Figure 2A:
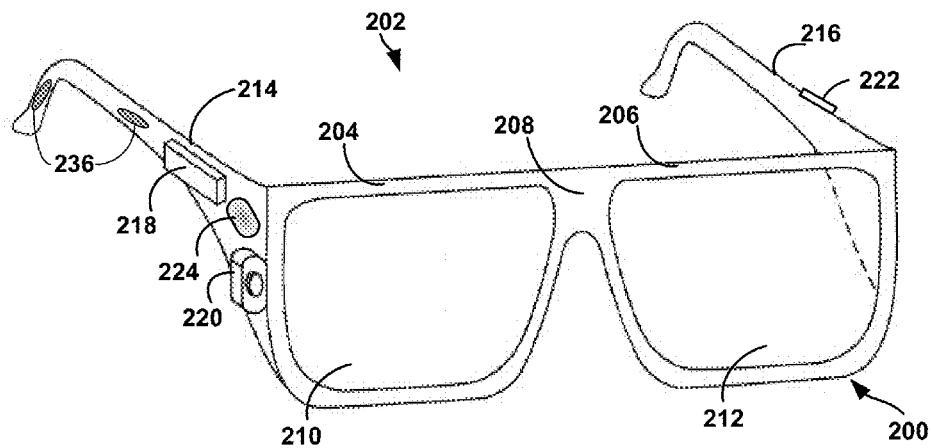
FIG. 2A illustrates an example of a wearable computing device.

FIG. 2A illustrates an example configuration for a wearable computing device 200. While FIG. 2A illustrates a head-mounted device 202 as an example of a wearable computing device, other types of wearable computing devices could additionally or alternatively be used. As illustrated in FIG. 2A, the head-mounted device 202 comprises frame elements including lens-frames 204, 206 and a center frame support 208, lens elements 210, 212, and extending side-arms 214, 216. The center frame support 208 and the extending side-arms 214, 216 are configured to secure the head-mounted device 202 to a user's face via a user's nose and ears, respectively.

Each of the frame elements 204, 206, and 208 and the extending side-arms 214, 216 may be formed of a solid structure of plastic and/or metal, or may be formed of a hollow structure of similar material so as to allow wiring and component interconnects to be internally routed through the head-mounted device 202. Other materials may be possible as well.

One or more of each of the lens elements 210, 212 may be formed of any material that can suitably display a projected image or graphic. Each of the lens elements 210, 212 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 214, 216 may each be projections that extend away from the lens-frames 204, 206, respectively, and may be positioned behind a user's ears to secure the head-mounted device 202 to the user. The extending side-arms 214, 216 may further secure the head-mounted device 202 to the user by extending around a rear portion of the user's head. Additionally or alternatively, for example, wearable computing device 200 may connect to or be affixed within a head-mounted helmet structure. Other possibilities exist as well.

Wearable computing device 200 may also include an on-board computing system 218, a video camera 220, a sensor 222, and a finger-operable touch pad 224. The on-board computing system 218 is shown to be positioned on the extending side-arm 214 of the head-mounted device 202; however, the on-board computing system 218 may be provided on other parts of the head-mounted device 202 or may be positioned remote from the head-mounted device 202 (e.g., the on-board computing system 218 could be wire- or wirelessly-connected to the head-mounted device 202). The on-board computing system 218 may include a processor and memory, for example. The on-board computing system 218 may be configured to receive and analyze data from the video camera 220 and the finger-operable touch pad 224 (and possibly from other sensory devices, user interfaces, or both) and generate images for output by the lens elements 210 and 212.

The video camera 220 is shown positioned on the extending side-arm 214 of the head-mounted device 202; however, the video camera 220 may be provided on other parts of the head-mounted device 202. The video camera 220 may be configured to capture images at various resolutions or at different frame rates. Many video cameras with a small form-factor, such as those used in cell phones or webcams, for example, may be incorporated into head-mounted device 202.

Further, although FIG. 2A illustrates one video camera 220, more video cameras may be used, and each may be configured to capture the same view, or to capture different views. For example, the video camera 220 may be forward facing to capture at least a portion of the real-world view perceived by the user. This forward facing image captured by the video camera 220 may then be used to generate an augmented reality where computer generated images appear to interact with the real-world view perceived by the user. In addition, wearable computing device 200 can include an inward-facing camera, perhaps configured to track the user's eye movements.

A sensor 222 is shown on the extending side-arm 216 of the head-mounted device 202; however, the sensor 222 may be positioned on other parts of the head-mounted device 202. The sensor 222 may include one or more of a location sensor, a gyroscope, an accelerometer, and/or one or more of sensors 148, for example. Other sensing devices may be included within, or in addition to, the sensor 222 or other sensing functions may be performed by the sensor 222.

The finger-operable touch pad 224 is shown on the extending side-arm 214 of the head-mounted device 202. However, the finger-operable touch pad 224 may be positioned on other parts of the head-mounted device 202. Also, more than one finger-operable touch pad may be present on the head-mounted device 202. The finger-operable touch pad 224 may be used by a user to input commands. The finger-operable touch pad 224 may sense at least one of a position and a movement of a finger via capacitive sensing, resistance sensing, or a surface acoustic wave process, among other possibilities. The finger-operable touch pad 224 may be capable of sensing finger movement in a direction parallel or planar to the pad surface, in a direction normal to the pad surface, or both, and may also be capable of sensing a level of pressure applied to the pad surface. The finger-operable touch pad 224 may be formed of one or more translucent or transparent insulating layers and one or more translucent or transparent conducting layers. Edges of the finger-operable touch pad 224 may be formed to have a raised, indented, or roughened surface, so as to provide tactile feedback to a user when the user's finger reaches the edge, or other area, of the finger-operable touch pad 224. If more than one finger-operable touch pad is present, each finger-operable touch pad may be operated independently, and may provide a different function.

FIG. 2A shows head-mounted device 202 with two emergency controls 236. Emergency controls 236 can be used to indicate an emergency situation. In some embodiments, more or fewer emergency controls 236 can be provided with head-mounted device 202.

One or more of emergency controls 236 can be used to indicate the emergency situation. In some embodiments, pressing, touching, moving, and/or otherwise contacting one of emergency controls 236 can cause head-mounted device 202 to generate an indication of an emergency situation. The indication can include an audible indication such as an alarm sound when head-mounted device 202 is equipped with speaker, a visible indication such a flashing light when head-mounted device 202 is equipped with a light configurable to be flashed, and/or generation of a communication, such as a telephone call, text message, and/or e-mail, to an emergency contact, such as the police, fire department, medical services, a private emergency contact, and/or other emergency contacts.

In other embodiments, multiple emergency controls 236 can be required to generate an emergency indication to prevent false alarms. For example, generation of emergency indication can required pressing at least one of the emergency controls in FIG. 2A on extending side-arm 214 and pressing at least one emergency control on extending side-arm 216 (not shown in FIG. 2A) simultaneously.

Figure 2B:
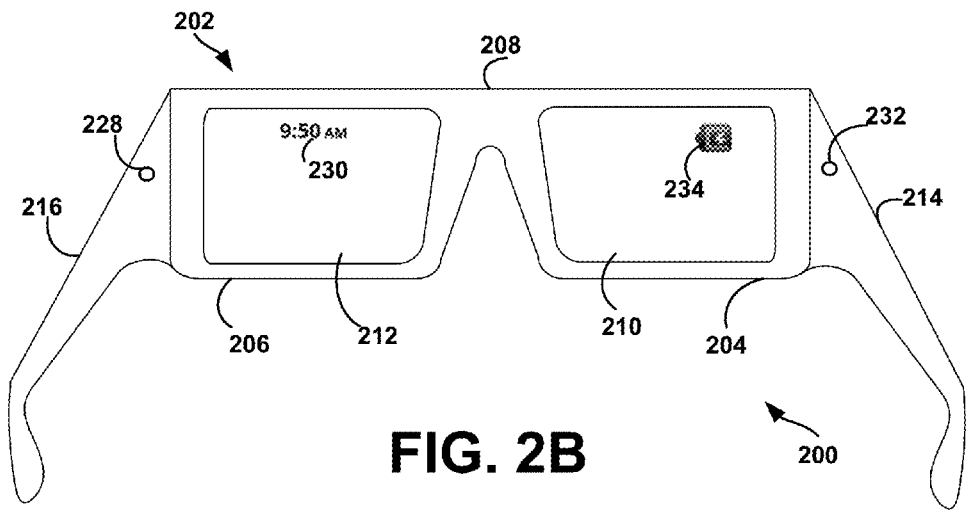
FIG. 2B illustrates an alternate view of the system illustrated in FIG. 2A.

FIG. 2B illustrates an alternate view of the system 200 illustrated in FIG. 2A. As shown in FIG. 2B, the lens elements 210, 212 may act as display elements. The head-mounted device 202 may include a first projector 228 coupled to an inside surface of the extending side-arm 216 and configured to project a display 230 onto an inside surface of the lens element 212. Additionally or alternatively, a second projector 232 may be coupled to an inside surface of the extending side-arm 214 and configured to project a display 234 onto an inside surface of the lens element 210.

The lens elements 210, 212 may act as a combiner in a light projection system and may include a coating that reflects the light projected onto them from the projectors 228, 232. In some embodiments, a reflective coating may not be used (e.g., when the projectors 228, 232 are scanning laser devices).

In alternative embodiments, other types of display elements may also be used. For example, the lens elements 210, 212 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 204, 206 for driving such a matrix display. Alternatively or additionally, a laser or LED source and scanning system could be used to draw a raster display directly onto the retina of one or more of the user's eyes. Other possibilities exist as well.

Figure 2C:
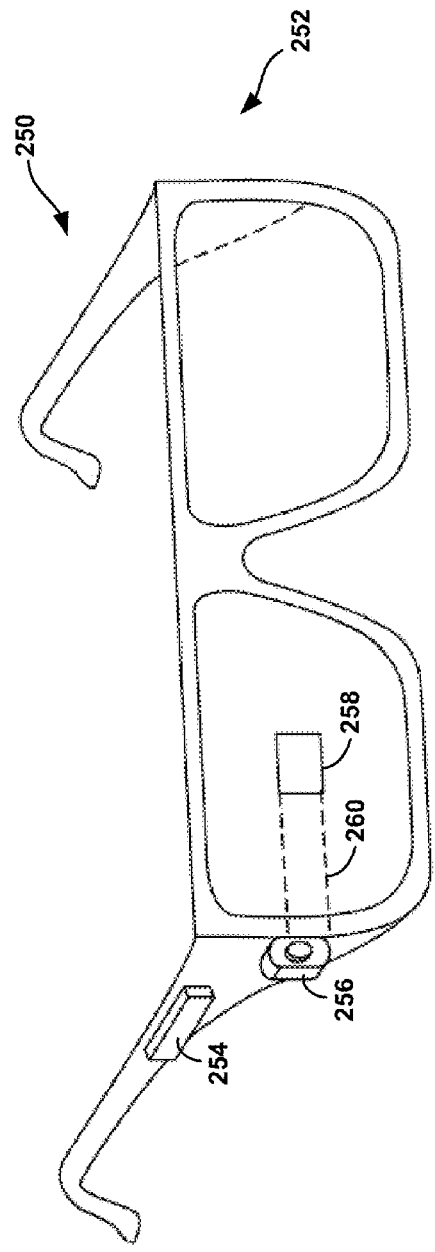
FIG. 2C illustrates an example system for receiving, transmitting, and displaying data.

FIG. 2C illustrates an example system for receiving, transmitting, and displaying data. The system 250 is shown in the form of a wearable computing device 252. The wearable computing device 252 may include frame elements and side-arms such as those described with respect to FIGS. 2A and 2B. The wearable computing device 252 may additionally include an on-board computing system 254 and a video camera 256, such as those described with respect to FIGS. 2A and 2B. The video camera 256 is shown mounted on a frame of the wearable computing device 252; however, the video camera 256 may be mounted at other positions as well.

As shown in FIG. 2C, the wearable computing device 252 may include a single display 258 which may be coupled to the device. The display 258 may be formed on one of the lens elements of the wearable computing device 252, such as a lens element described with respect to FIGS. 2A and 2B, and may be configured to overlay computer-generated graphics in the user's view of the physical world. The display 258 is shown to be provided in a center of a lens of the wearable computing device 252; however, the display 258 may be provided in other positions. The display 258 is controllable via the computing system 254 that is coupled to the display 258 via an optical waveguide 260.

Figure 2D:
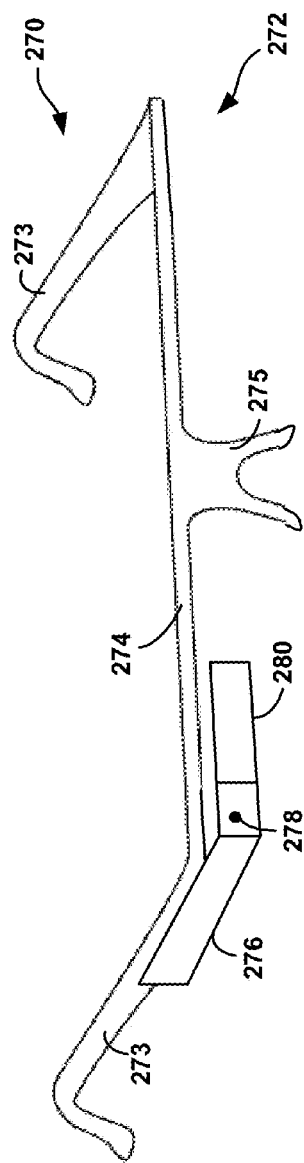
FIG. 2D illustrates an example system for receiving, transmitting, and displaying data.

FIG. 2D illustrates an example system for receiving, transmitting, and displaying data. The system 270 is shown in the form of a wearable computing device 272. The wearable computing device 272 may include side-arms 273, a center frame support 274, and a bridge portion with nosepiece 275. In the example shown in FIG. 2D, the center frame support 274 connects the side-arms 273. The wearable computing device 272 does not include lens-frames containing lens elements. The wearable computing device 272 may additionally include an on-board computing system 276 and a video camera 278, such as those described with respect to FIGS. 2A and 2B.

The wearable computing device 272 may include a single lens element 280 that may be coupled to one of the side-arms 273 or the center frame support 274. The lens element 280 may include a display such as the display described with reference to FIGS. 2A and 2B, and may be configured to overlay computer-generated graphics upon the user's view of the physical world. In one example, the single lens element 280 may be coupled to the inner side (i.e., the side exposed to a portion of a user's head when worn by the user) of the extending side-arm 273. The single lens element 280 may be positioned in front of or proximate to a user's eye when the wearable computing device 272 is worn by a user. For example, the single lens element 280 may be positioned below the center frame support 274, as shown in FIG. 2D.

As described in the previous section and shown in FIG. 1, some exemplary embodiments may include a set of audio devices, including one or more speakers and/or one or more microphones. The set of audio devices may be integrated in a wearable computer 202, 250, 270 or may be externally connected to a wearable computer 202, 250, 270 through a physical wired connection or through a wireless radio connection.

Cloud-Based Experience Sharing

In some exemplary embodiments a remote server may help reduce the sharer's processing load. In such embodiments, the sharing device may send the share to a remote, cloud-based serving system, which may function to distribute the share to the appropriate viewing devices. As part of a cloud-based implementation, the sharer may communicate with the server through a wireless connection, through a wired connection, or through a network of wireless and/or wired connections. The server may likewise communicate with the one or more viewers through a wireless connection, through a wired connection, or through a network of wireless and/or wired connections. The server may then receive, process, store, and/or transmit both the share from the sharer and comments from the viewers.

Figure 2E:
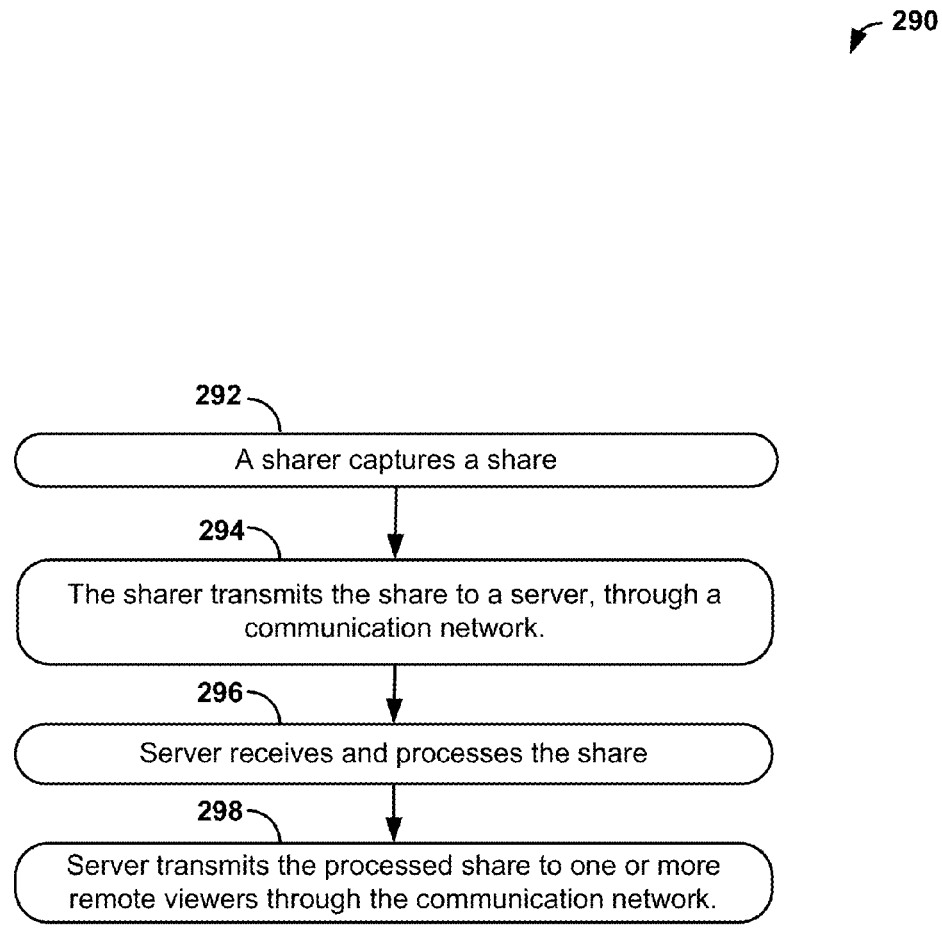
FIG. 2E is a flow chart illustrating a cloud-based method, according to an exemplary embodiment.

FIG. 2E is a flow chart illustrating a cloud-based method, according to an exemplary embodiment. In particular, method 290 may include the sharer capturing a share 292. Also, the sharer may transmit the share to a server through a communication network 294. Next, the server may receive and process the share 296. Then, the server may transmit the processed share to at least one viewer 298.

An experience-sharing server may process a share in various ways before sending the share to a given viewer. For example, the server may format media components of a share to help adjust for a particular viewer's needs or preferences. For instance, consider a viewer that is participating in an experience-sharing session via a website that uses a specific video format. As such, when the share includes a video, the experience-sharing server may format the video in the specific video format used by the website before transmitting the video to this viewer. In another example, if a viewer is a PDA that can only play audio feeds in a specific audio format, the server may format an audio portion of a share in the specific audio format used by the PDA before transmitting the audio portion to this viewer. Other examples of formatting a share (or a portion of a share) for a given viewer are also possible. Further, in some instances, the ES server may format the same share in a different manner for different viewers in the same experience-sharing session.

Further, in some instances, an experience-sharing server may compress a share or a portion of a share before transmitting the share to a viewer. For instance, if a server receives a high-resolution share, it may be advantageous for the server to compress the share before transmitting it to the one or more viewers. For example, if a connection between a server and a certain viewer runs too slowly for real-time transmission of the high-resolution share, the server may temporally or spatially compress the share and send the compressed share to the viewer. As another example, if a viewer requires a slower frame rate for video feeds, a server may temporally compress a share by removing extra frames before transmitting the share to that viewer. And as another example, the server may be configured to save bandwidth by downsampling a video before sending the stream to a viewer that can only handle a low-resolution image. Additionally or alternatively, the server may be configured to perform pre-processing on the video itself, e.g., by combining multiple video sources into a single feed, or by performing near-real-time transcription (closed captions) and/or translation.

Yet further, an experiencing-sharing server may decompress a share, which may help to enhance the quality of an experience-sharing session. In some embodiments, to reduce transmission load on the connection between a sharer and a server, the sharer may compress a share before sending the share to the server. If transmission load is less of a concern for the connection between the server and one or more viewers, the server may decompress the share before sending it to the one or more viewers. For example, if a sharer uses a lossy spatial compression algorithm to compress a share before transmitting the share to a server, the server may apply a super-resolution algorithm (an algorithm which estimates sub-pixel motion, increasing the perceived spatial resolution of an image) to decompress the share before transmitting the share to the one or more viewers. In another implementation, the sharer may use a lossless data compression algorithm to compress a share before transmission to the server, and the server may apply a corresponding lossless decompression algorithm to the share so that the share may be usable by the viewer.

Figure 3A:
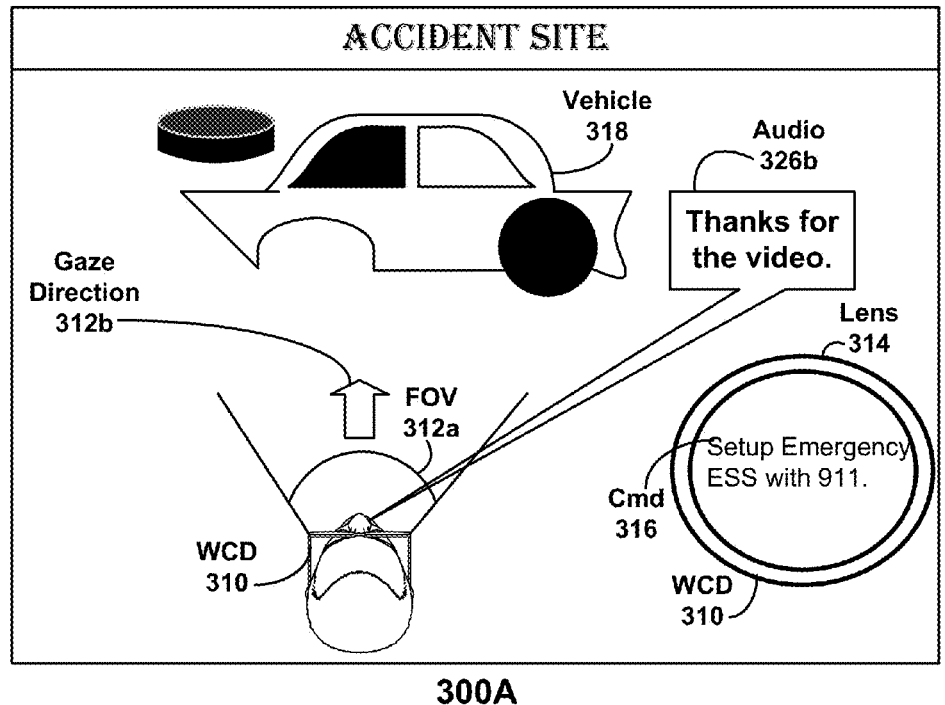
FIG. 3A illustrates an emergency scenario and an emergency response.
Figure 3A:
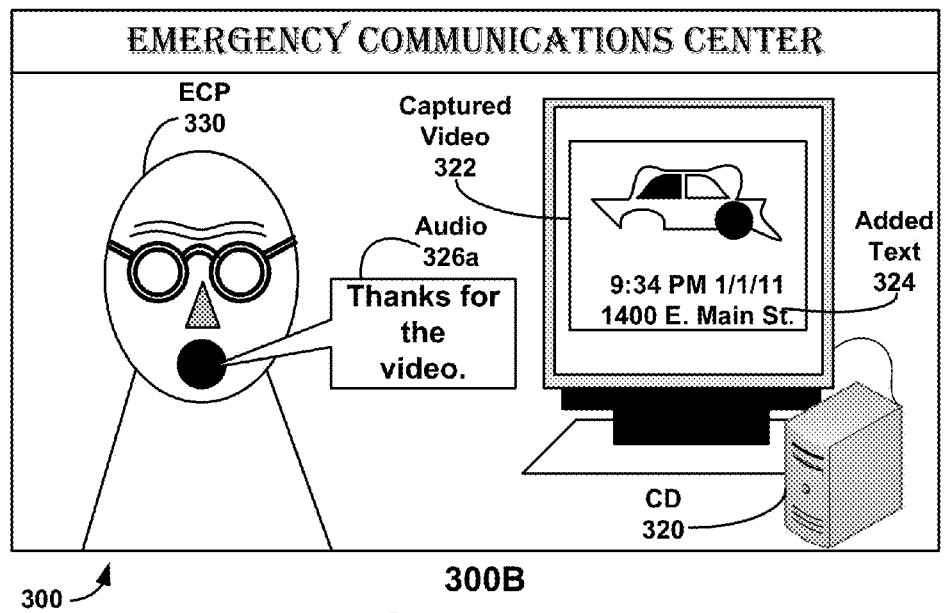
Figure 3B:
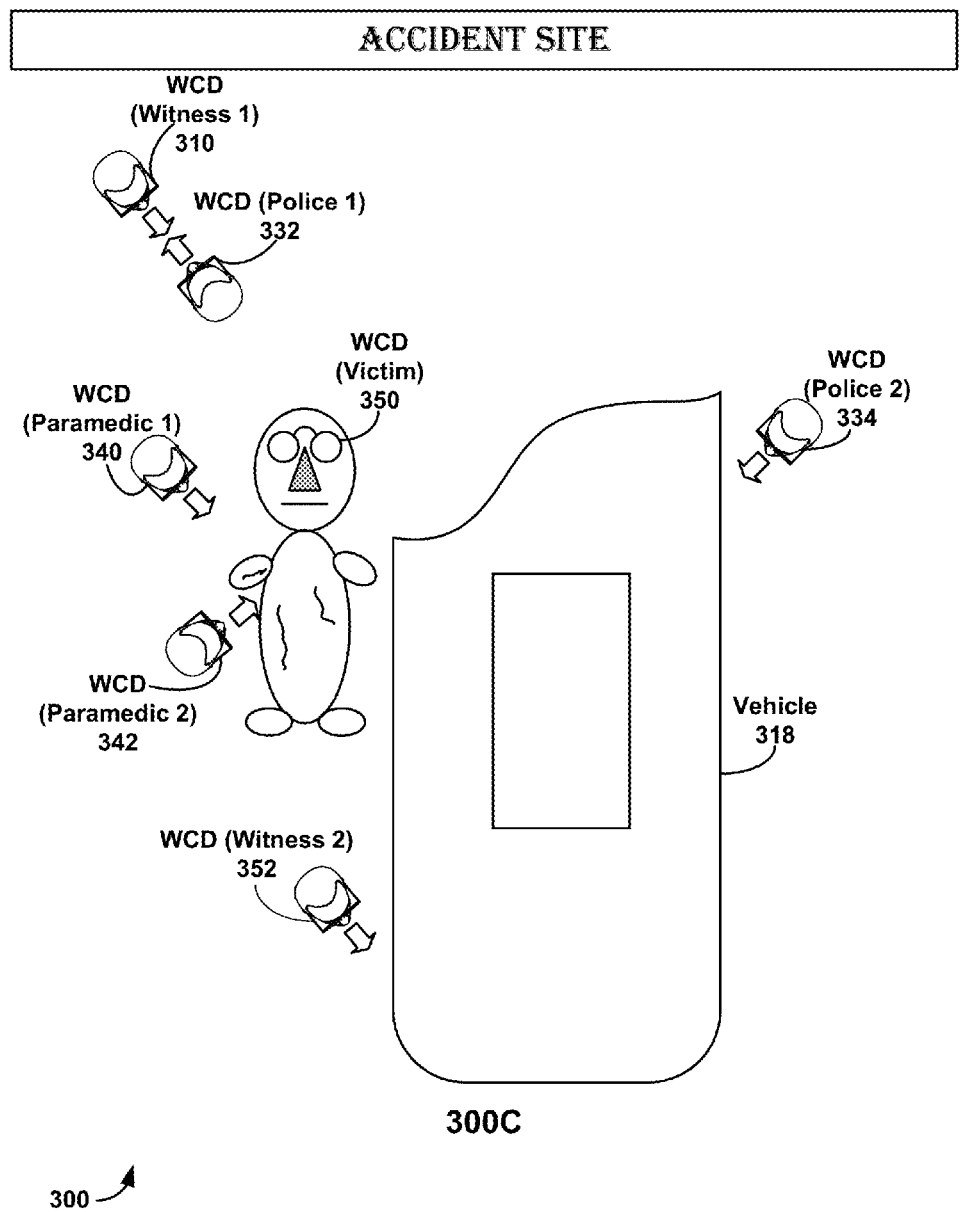
FIG. 3B continues illustrating the emergency scenario and emergency response.
Figure 3C:
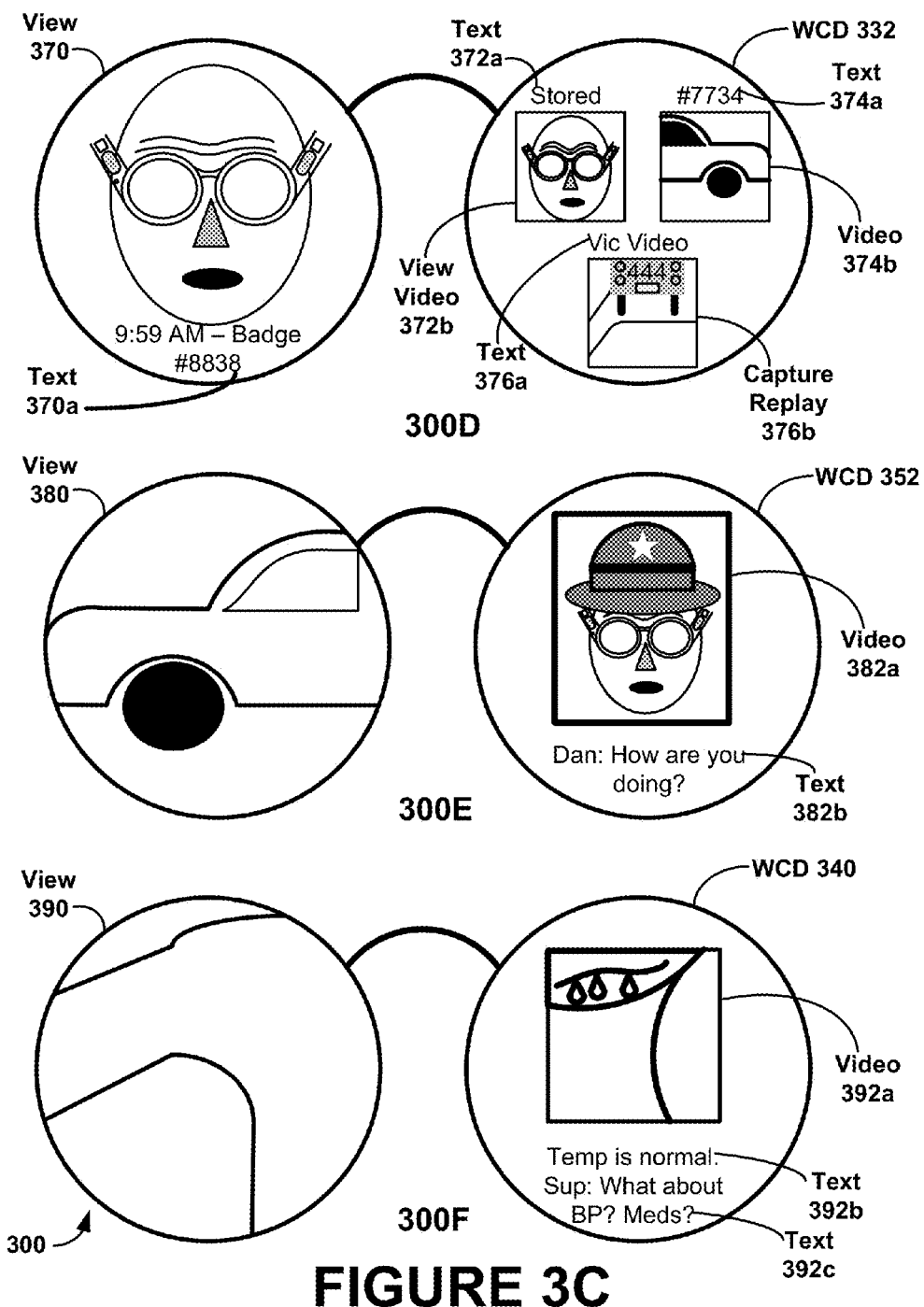
FIG. 3C illustrates various experience sharing sessions related to the emergency scenario and emergency response.

Exemplary Emergency Service Applications of Experience Sharing a. Accident Response Scenarios FIGS. 3A-3C depict a scenario that illustrates experience sharing sessions can be used by a variety of parties in a common emergency situation—a car accident. The scenario begins with an accident victim establishing contact with an emergency service provider by using an experience sharing session to both make a 911 call to an emergency communications center and to provide video and other information from the accident site in real-time to the emergency communications center.

The scenario continues with three experience sharing sessions being established: one between the accident victims, one between the responding police, and one between paramedics on the scene. Information is shared between the various experience sharing sessions—to review previously taken video footage, to discuss medical conditions, and to discuss questions asked at the scene. Using the experience sharing sessions, experts can be contacted and resources, such as hospital beds, ambulances, and medical supplies, can be allocated to respond to the emergency situation.

FIGS. 3A-3C illustrate an emergency scenario 300. FIG. 3A shows 300A of scenario 300 located at an accident site, where vehicle 318 has been damaged. Wearable computing device (WCD) 310 is utilized to set up an ESS with an emergency communications center, such as a 911 call center.

For example, as shown in FIG. 3A, a command (Cmd) 316, which is shown in FIG. 3A as "Setup Emergency ESS with 911," can be executed by wearable computing device 310 to establish an ESS with the emergency communications center. Command 316 can be provided to wearable computing device 510; for example, as a voice command, a textual command, a gesture, or a combination thereof. Command 316 is display using lens 314 of wearable computing device 310. Alternatively, command 316 might not be displayed by wearable computing device 310; for example, when command 316 is provided as a voice command to wearable computing device 310.

In other embodiments, a dedicated emergency control, such as emergency controls 236, graphical user interface object, voice command, other text commands (e.g., "ESS 911"), and/or other indication can be used to set up an ESS with an emergency communications center. For example, wearable computing device 310 can establish an ESS with the emergency communications center after the emergency indicator is physically actuated, such as when the panic button and/or graphical user interface object is pressed, tapped, or clicked on.

In still other embodiments, wearable computing device 310 can include one or more sensors for generating biometric indications, such as heart-rate, breathing-rate and temperature sensors. Then, an emergency situation may be detected and/or indicated based on one or more of the biometric indications, such as an elevated heart rate detected by a heart-rate sensor of wearable computing device 310. In particular embodiments, wearable computing device 310 can use the biometric indications and other indications to verify emergency situations; for example, by determining that a person has not moved for a long period of time based on data from location sensors, and/or that the biometric information indicates abnormal readings, wearable computing device 310 can determine that the wearer of wearable computing device 310 cannot move and indicate this as an emergency situation.

In other embodiments, wearable computing device 310 can determine and/or indicate that the emergency situation exists using other sensors, or perhaps additional sensors to biometric indication sensors, such as microphone(s), video camera(s), touch pad(s), keyboard(s), and/or other sensors. For example, wearable computing device 310 can infer that the emergency situation exists based on detected sounds and/or utterances, such as sounds/utterances related to accidents or vehicle crashes, sounds above a threshold decibel level, utterances with words such as "Help" or "Call the police!", and so on. As another example, wearable computing device 310 can infer that the emergency situation exists based on detected images, such as images of accidents, explosions, falling people, and so on. Many other examples of wearable computing device 310 automatically determining and/or indicating emergency situations are possible as well.

In response to detecting that an emergency situation exists, wearable computing device 310 can establish an emergency ESS with an emergency communications center, perhaps after confirmation that a wearer of wearable computing device 310 desires to establish the emergency ESS.

In other scenarios, a wearer of wearable computing device 310 can be warned about possible future emergencies. For one example, the wearer can indicate to wearable computing device 310 potential-emergency information, including but not limited to textual, audio, and/or video data, which specifies possible emergency situations. For example, the textual data can include address(es) of potential emergency locations, such as recently reported crime or accident locations. Audio and/or video data can be used to later identify potential persons, locations, or entities that the wearer has indicated are related to potential emergencies. For example, audio and/or video data can include voice, other audio, images, and/or video related to a person or persons related to potential emergencies. In some of these embodiments, the potential-emergency information can be stored in and/or include information stored in one or more databases, perhaps accessible via one or more networks.

In scenario 300, the emergency communication center is configured to support ESSs. In other scenarios, an emergency communication center can be equipped to only handle a portion of an ESS, such as a voice-only ESS. In either event, wearable computing device 310 can negotiate with computing device(s) at the emergency communication center to determine which protocol(s), frequency/frequencies, channels, bandwidths, etc. can be utilized for transmission of audio and/or video portions of an ESS.

At 300B of scenario 300, wearable computing device 310 and computing device 320, used by emergency communications personnel (ECP) 330 at the emergency communication center, establish an ESS. As part of the ESS, wearable computing device 310 provides captured video 322 to computing device (CD) 320. As shown in FIG. 3A, captured video 322 can be a real-time or near-real-time display of field of view (FOV) 312a corresponding to gaze direction 312b of wearable computing device 310, as captured by a video camera on wearable computing device 310. Once the video is captured, wearable computing device 310 can communicate captured video 322 to computing device 320. In addition, wearable computing device 310 and/or computing device 320 can be configured to add text to captured video 322, such as time/date information, location information, captions, and/or other text.

For example, wearable computing device 310 can provide location information and/or location estimates to computing device 320, and computing device 320 can generate a textual indication of the location of wearable computing device 310 and thus, the accident site. FIG. 3A shows added text 324 that includes location information: "1400 E. Main St." In some embodiments, a textual location indication, such as a street address, can be provided by wearable computing device 310. Alternatively or additionally, wearable computing device 310 can provide coordinate-based location information, such as latitude and longitude coordinates, to computing device 320, which in turn can generate a textual location indication based on the coordinate-based location information. In still other embodiments, other types of data, such as audio commentary, images, video, and/or other data can be added to captured video 322.

At 300B of FIG. 3A, computing device 320 displays captured video 322 and added text 324 to emergency communication personnel 330. Scenario 300 continues with emergency communication personnel 330 saying "Thanks for the video" which is communicated as audio 326a during the ESS established between computing device 320 and wearable computing device 310, and played using wearable computing device 310 as audio 326b.

FIG. 3B depicts 300C of scenario 300, in which several wearable computing devices are used at the accident site. For example, FIG. 3B indicates that a wearer (Witness 1), of wearable computing device 310 is communicating with a wearer (Police 1) of wearable computing device 330. FIG. 3B also indicates that a wearer (Victim) of wearable computing device 350, is being observed by wearers (Paramedic 1) and (Paramedic 2) of wearable computing devices 340 and 342, respectively, and wearers (Police 2) and (Witness 2) of wearable computing devices 334 and 352 are both examining vehicle 318.

In scenario 300, wearable computing devices 332 and 334 are communicating via a first ESS, wearable computing devices 310 and 352 are communicating via a second ESS, and wearable computing devices 340 and 342 are communicating via a third ESS.

FIG. 3C shows example depictions of these three ESSs. FIG. 3C shows, at 300D of scenario 300, the first ESS from wearable computing device 332, corresponding to wearer (Police 1). On the left side of wearable computing device 332 is view 370, which shows the real world through wearable computing device 332, along with added text 370a. In some embodiments, view 370 and/or text 370a can be captured as captured video for later and/or simultaneous replay.

FIG. 3C shows the right side of wearable computing device 332 with view video 372b, text 374a, video 374b, text 376a, and capture replay 376b. View video 372b is a simultaneous replay of view 370 without text 370a. Rather, view video 372a is shown with text 372a of "Stored" indicating that wearable computing device 330 has successfully stored view video 372b.

In scenario 300, video 374b is communicated from wearable computing device 334, corresponding to viewer (Police 2), to wearable computing device 332 as part of the first ESS. Text 374a of "#7734" indicates that video 374b is from Badge number #7734, which is the badge number wearer of wearable computing device 334. In some embodiments, view video 372b and/or capture replay 376b can be communicated using the first ESS as well.

FIG. 3C shows that capture replay 376b includes images taken by wearable computing device 350 prior to the accident, which are being viewed by the wearer of wearable computing device 330 as part of an accident investigation process. Text 376a of "Vic Video" indicates that capture replay 376b is a replay of video stored on wearable computing device 350, worn by Victim (or Vic for short) as shown in FIG. 3C.

FIG. 3C shows, at 300E of scenario 300, the second ESS from wearable computing device 352, corresponding to wearer (Witness 2). On the left side of wearable computing device 352 is view 380, which shows the real world through wearable computing device 352. In some embodiments, view 380 can be captured as captured video for later and/or simultaneous replay.

FIG. 3C at 300E shows video 382a and text 382b on the right side of wearable computing device 352. Video 382a shows video images from wearable computing device 310, corresponding to wearer (Witness 1), as part of the second ESS. Text 382b, also communicated via the second ESS, is shown as "Dan: How are you doing?" In particular, the text "Dan:" indicates an identifier of the wearer or wearable computing device 310; e.g., the first name of the wearer of wearable computing device 310 is Dan. In some scenarios, the wearer of wearable computing device 352 replies to text 382b with a textual, audio, and/or video message.

FIG. 3C shows, at 300F of scenario 300, the third ESS from wearable computing device 340, corresponding to wearer (Paramedic 1). On the left side of wearable computing device 340 is view 390, which shows the real world through wearable computing device 340. In some embodiments, view 390 can be captured as captured video for later and/or simultaneous replay.

FIG. 3C at 300F shows video 392a and text 392b, 392c. Video 392a shows video images from wearable computing device 342, corresponding to wearer (Paramedic 2), as part of the third ESS. Text 392b, also communicated via the third ESS, is shown as "Temp is normal." Unlike text 382b, text 392b does not include an identifier. In some embodiments, display or non-display of identifiers associated with messages, such as text 392b, can be controlled via user settings. In some scenarios, the wearer of wearable computing device 340 can reply to text 392b with a textual, audio, and/or video message; e.g., a text message of "There is a cut and it needs some attention."

In some scenarios, remote viewers can participate in an ESS. Text 392c, also communicated via the third ESS, is shown as "Sup: What about BP? Meds?" indicating that the supervisory paramedic, who is monitoring the third ESS, has asked about blood pressure of the victim and any medications that the victim might have been taking. In particular scenarios, remote or non-remote viewers can request that others allocate resources depending on the information in the ESS. For example, the supervisory paramedic can forward video of the third ESS captured by wearable computing device 340 to others; e.g., for this example, others can include doctors, nurses, hospital personnel, other paramedics, and/or other personnel for viewing. The others can, in some cases, provide feedback, including instructions to the sharer and viewers of the third ESS; e.g., "Get that cut stabilized" or "Can you look at the left leg?" The sharer, viewers and/or others can also allocate resources based on the ESS; in this example, the others can ask for other doctors, hospital resources, medical resources such as blood, splints, gauze, etc., and/or medications to care for the victim.

b. Remote Observation Scenarios

Figure 4:
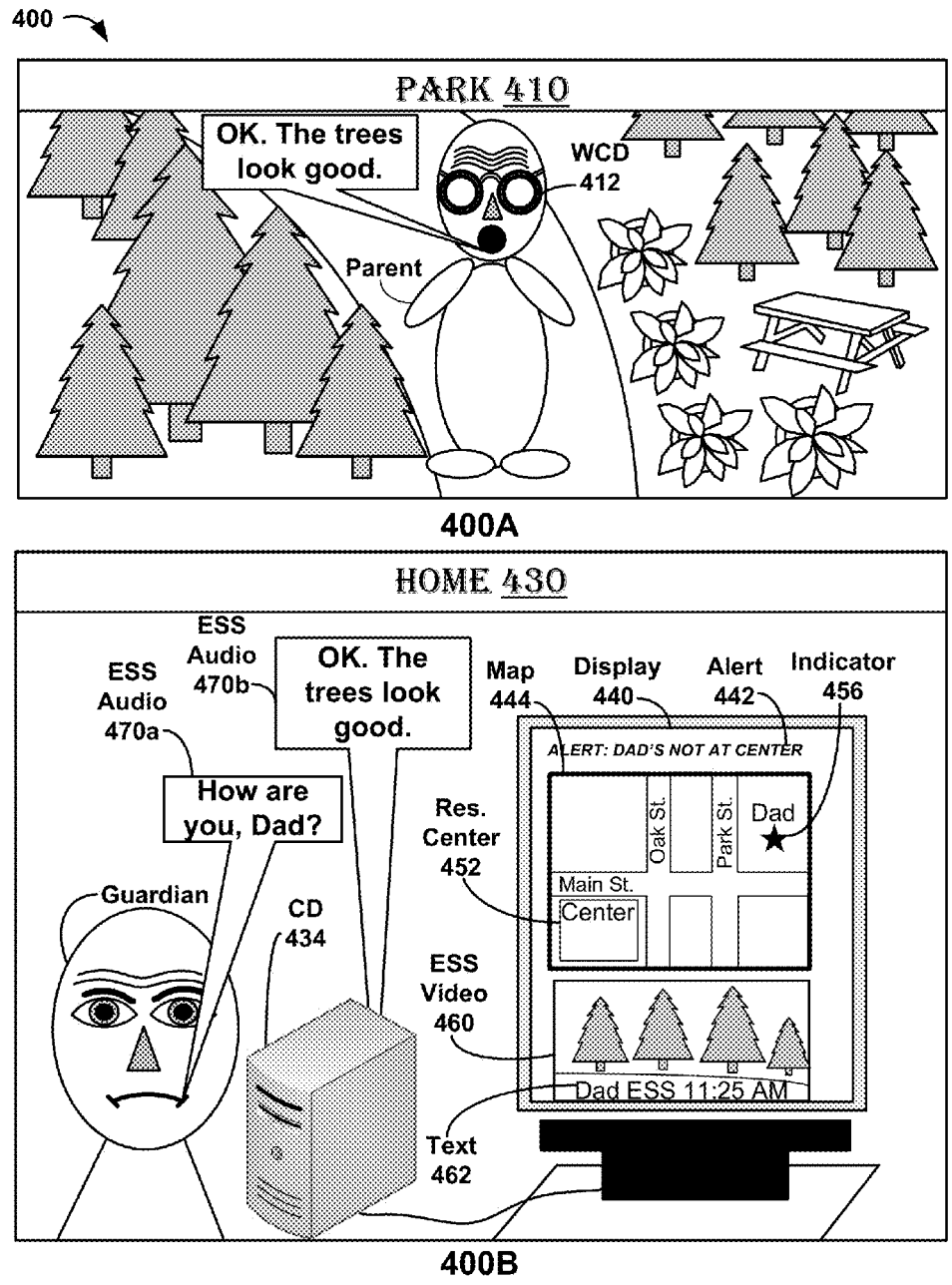
FIG. 4 shows a scenario with use of experience sharing sessions for remote observation.

FIG. 4 shows a scenario where a family member ("Guardian") has been given guardianship over his/her aged parent ("Parent"). In this scenario, Guardian, with Parent's consent, has established an experience sharing session with Parent that permits Guardian to observe Parent's location, receive audio-video information from Parent's point of view, and receive alerts when Parent is at an unexpected location.

FIG. 4 shows scenario 400 with use of ESSs for remote observation. At 400A of FIG. 4, WCD 412 is being worn by Parent who is shown in park 410. To help Guardian care for Parent, Parent has also agreed to wear WCD 412 when possible and maintain an experience sharing session with Guardian that helps Guardian watch over Parent. Parent has also agreed to provide information, such as location information, via WCD 412 to legitimate sources, such as Guardian or one or more care providers, to help Guardian care for Parent. In some embodiments, Parent can approve each legitimate source. WCD 412 can store information about legitimate sources, such as name, addressing information, passwords, etc., that identify legitimate sources for requests for information. Then, in response to a received request for information, WCD 412 can provide information to legitimate sources or can ignore requests that do not come from a legitimate source.

At block 400B of FIG. 4, scenario 400 continues with an alert 442 being shown on display 440 of Guardian's computing device 434. As part of scenario 400, computing device 434 is part of an ESS with WCD 412. In other scenarios not shown in FIGS. 4A and 4B, computing device 434 is a wearable computing device.

As part of the ESS between WCD 412 and computing device 434, WCD 412 provides location information to computing device 434. The location information can be utilized to generate map 444 shown using display 440 of computing device 434 with an indicator 456 of the location of "Dad" as the wearer of WCD 412.

Additionally, the location information from WCD 412 can be compared to expected location information, perhaps stored on computing device 434. The expected location information can include a list of locations where a WCD is expected to be, a corresponding list of times associated with the locations, and alert-thresholds around each location.

Example location information for WCDs 412 is shown in Table 1 below:

TABLE 1

| WCD | Start Time | End Time | Days of Week | Location | Alert Threshold |
| --- | --- | --- | --- | --- | --- |
| 412 | 8 AM | 11:30 AM | Everyday | Center | 100 ft. |
| 412 | 11:45 AM | 1:45 PM | Sun | Church 1 | 100 ft. |
| 412 | 11:45 AM | 1:45 PM | MWF | Child 2 | 5 miles |
| 412 | 11:45 AM | 1:45 PM | TuThSat | Child 1 | 5 miles |
| 412 | 2:00 PM | 5:00 PM | Everyday | Center | 100 ft. |
| 412 | 5:15 PM | 6:45 PM | MTu | Restaurant 1 | 100 ft. |
| 412 | 5:15 PM | 7:45 AM | WThFSatSun | Center | 100 ft. |
| 412 | 7:00 PM | 7:45 AM | MTu | Center | 100 ft. |

For example, the third data row of Table 1 indicates that WCD 412, associated with Dad, should be within 5 miles of location "Child 2" between 11:45 AM and 1:45 PM on Monday (M), Wednesday (W), and Friday (F). If WCD 412 is not within 5 miles of Child 2 between 11:45 AM and 1:45 PM on a Monday, Wednesday or Friday, then computing device 434 can display an alert, similar to alert 442 shown in FIG. 4B. The alert can be generated by WCD 412 or by computing device 432. In some embodiments, alert 442 can be, or can include, other information beyond text, such as audio, video, images and/or other alert-data.

At 400B of FIG. 4, Guardian reviews alert 442, map 444, and indicator 456 to verify Parent's location. FIG. 4B shows that map 444 indicates that Parent is not at center 452, but rather is a few blocks away, as shown by indicator 456.

In scenario 400, Guardian, upon observing alert 442 and map 444, directs computing device 434 to show a video portion of the ESS with WCD 412. FIG. 4B shows ESS Video 460 with an image taken by WCD 412 from a point of view of a wearer of WCD 412. This image includes a view of trees, which further indicates that Dad is likely not at residence center 452. In some scenarios, such as scenario 400, additional text can be generated with the video portion. FIG. 4B shows text 462 of "Dad ESS 11:25 AM" added to ESS Video 460.

Continuing scenario 400, Guardian directs computing device 434 to activate an audio portion of the ESS with WCD 412. Upon activating the audio portion of this ESS, Guardian provides ESS Audio 470a of "How are you, Dad?" to computing device 434, to be transmitted to WCD 412 as part of that ESS's audio portion. In response, scenario 400 indicates that WCD 412 provides ESS Audio 470b of "OK. The trees look good." to computing device as part of the ESS audio portion.

c. Mapping Scenarios

Figure 5A:
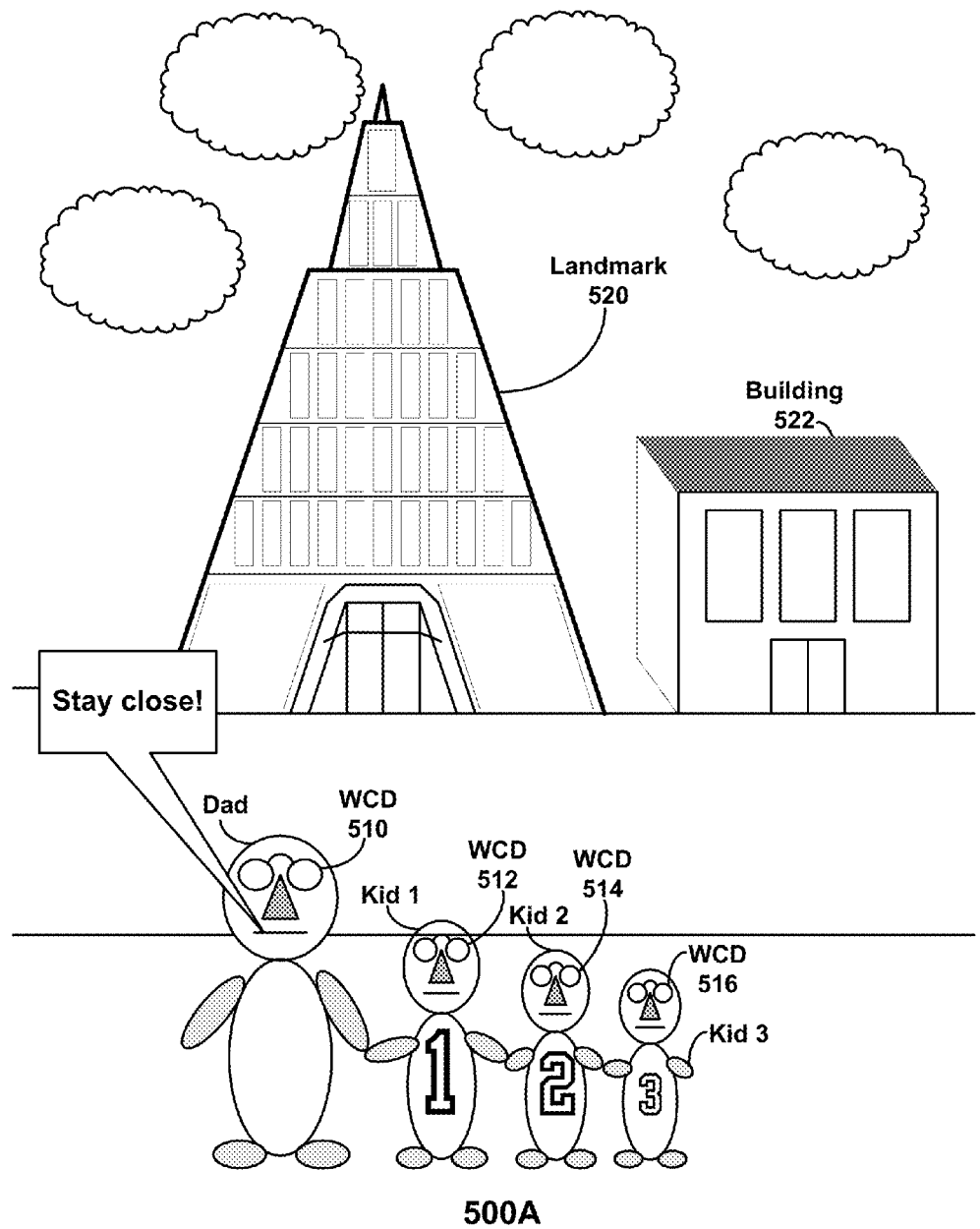
FIGS. 5A and 5B show an example scenario with the use of experience sharing sessions for mapping.
Figure 5B:
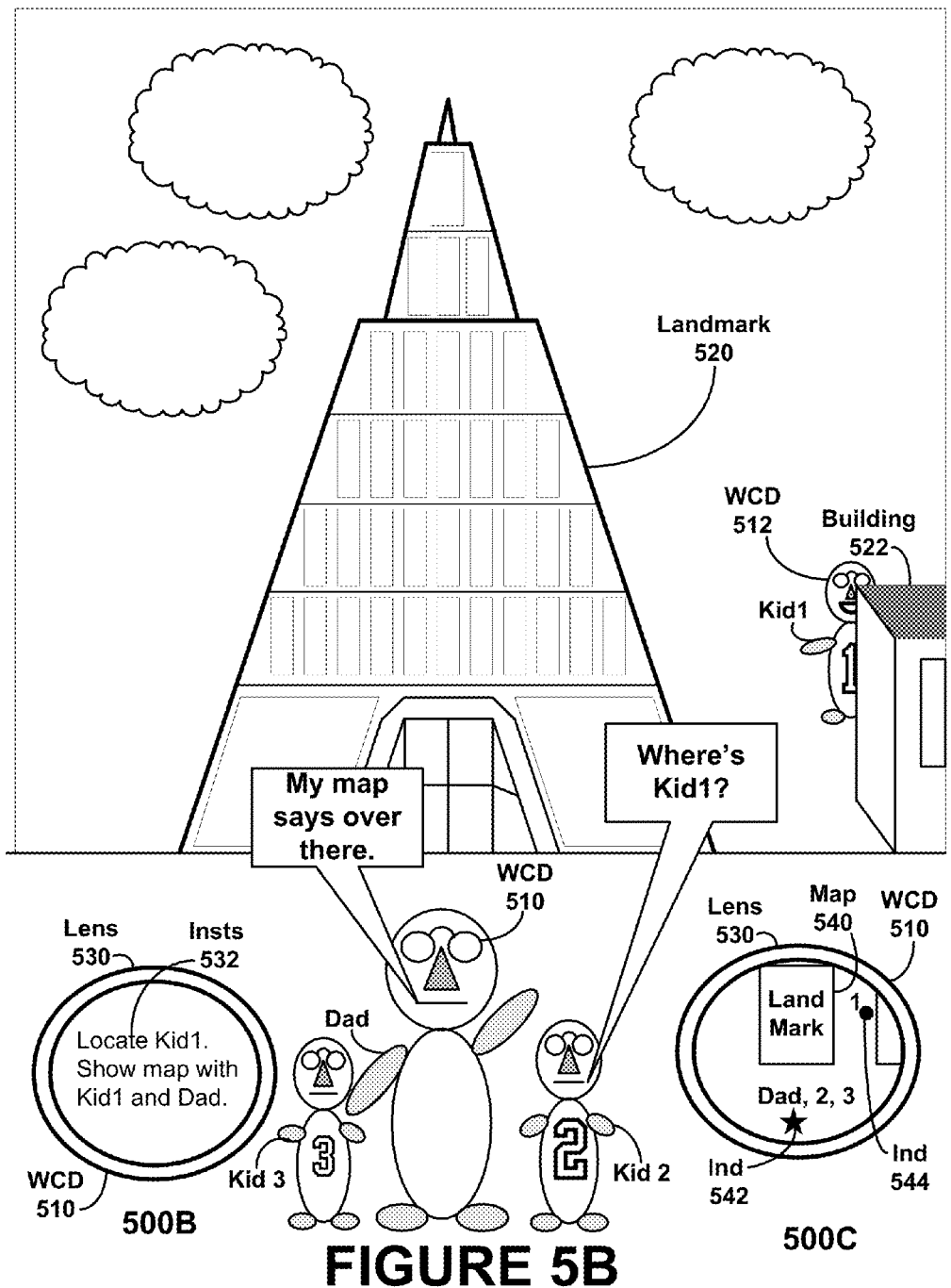

FIGS. 5A and 5B shows a scenario where an adult is taking three children on vacation, and one child wanders off. The adult uses an experience sharing session to locate the wandering child and map both the adult's and wandering child's location. Then, the adult can use the map to find the wandering child and then continue to enjoy the vacation.

FIGS. 5A and 5B show scenario 500 with use of ESSs for mapping. At block 500A of FIG. 5A, a family is shown on a trip to landmark 520. The family includes "Dad" wearing wearable computing device 510, and three children "Kid1", "Kid2", and "Kid3" each wearing respective wearable computing devices 512, 514, and 516. As part of scenario 500, Dad tells Kids 1-3 to "Stay close!"

FIG. 5B shows that Kid 1 has wandered behind building 522 near landmark 520, while Kids 2 and 3 have stayed close to Dad. Kid 2 then asks Dad "Where's Kid1?"

At 500B of FIG. 5B, Dad instructs wearable computing device 510 with commands 532 to "Locate Kid1. Show map with Kid1 and Dad." Commands 532 can be provided to wearable computing device 510 at least as voice command(s), textual command(s), gesture(s), and combinations thereof. In response to the "Locate Kid1" command, wearable computing device 510 can establish, if not already established, an ESS with wearable computing device 512 associated with Kid1. Once an ESS between wearable computing devices 510 and 512 is established, wearable computing device 510 can request location information from wearable computing device 512.

In response to the "Show map with Kid1 and Dad" command, wearable computing device 510 can first determine locations of both "Kid1" and "Dad", determine coordinates for a map that includes both locations, generate either a request for a map based on the determined coordinates or generate the map, and then display the map including indicators of the locations of at least "Kid1" and "Dad."

At 500C of FIG. 5B, lens 530 of wearable computing device 510 is shown displaying a map with indicators 542 and 544, for Dad (shown in FIG. 5B as a star) and Kid1 (shown in FIG. 5B as a solid dot with a "1" nearby), respectively. In scenario 500, Dad looks at the map, says "My map says over there" and points in the direction of Kid 1 behind building 522.

In other scenarios not shown in FIGS. 5A and 5B, wearable computing devices 510 and 512 can exchange audio, video, and/or other types of information. For example, wearable computing device 510 can transmit a copy of map 540 to wearable computing device 512 to help Kid1 locate Dad, or wearable computing device 512 can transmit captured video to wearable computing device 510 to indicate what Kid1 is seeing. As another example, Dad can use wearable computing device 510 to provide instructions to Kid1 via wearable computing device 512, such as "Stay there" or "Go to the Landmark." Many other examples and scenarios are possible as well.

Example Operations

Figure 6:
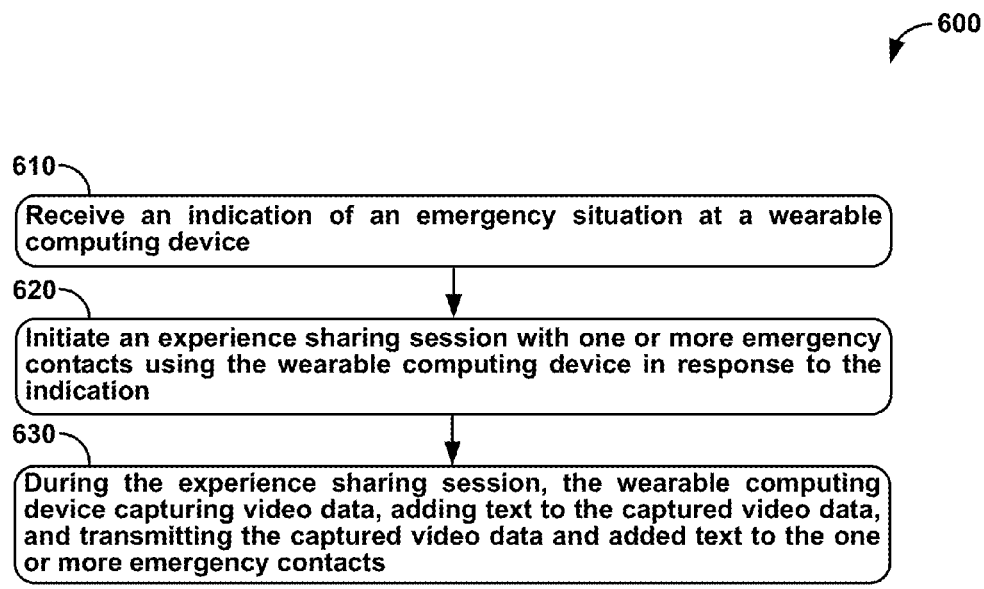
FIG. 6 is a flowchart of a method, in accordance with an example embodiment.

FIG. 6 is a flow chart of an example method 600 in accordance with an example embodiment. At block 610, a wearable computing device can receive an indication of an emergency situation. Receiving indications of emergency situations at wearable computing devices is described above with reference to at least FIGS. 3A-4B.

In some embodiments, the wearable computing device receiving an indication of an emergency situation includes the wearable computing device receiving user input, such as discussed above in the context of at least FIGS. 3A and 5B. In particular embodiments, the user input includes a voice command, such as discussed above in the context of at least FIGS. 3A and 5B. In other particular embodiments, the user input includes physical actuation of an emergency indicator on the wearable computing device, such as discussed above in the context of at least FIG. 3A.

In other embodiments, the wearable computing device receiving an indication of an emergency situation includes the wearable computing device receiving a biometric indication, such as discussed above in the context of at least FIG. 3A.

At block 620, the wearable computing device, in response to the indication, can initiate an experience sharing session with one or more emergency contacts, such as described above with reference to at least FIG. 3A.

At block 630, the wearable computing device can, during the experience sharing session, capture video, add text to the captured video data, and transmit the captured video and added text to the one or more emergency contacts, such as described above with reference to at least FIG. 3A.

In some embodiments, such as described above in the context of at least FIGS. 3A and 5B, method 600 also includes: (i) the wearable computing device obtaining a location estimate for the wearable computing device; and (ii) the wearable computing device transmitting the location estimate to at least one of the one or more emergency contacts.

In other embodiments, such as described above in the context of at least FIGS. 1-2A, the wearable computing device can include a head-mounted display. In some of these other embodiments, such as described above in the context of at least FIGS. 1-3, the video camera can be mounted on the head-mounted display.

In yet other embodiments, such as described above in the context of at least FIGS. 1-3, the wearable computing device can include a microphone. Then, during the experience sharing session, the wearable computing device can capture audio using the microphone and can transmit the captured audio to the one or more emergency contacts.

In even other embodiments, such as described above in the context of at least FIG. 3A, the one or more emergency contacts can include at least one public emergency services provider; while in some other embodiments, such as described above in the context of at least FIG. 5B, the one or more emergency contacts can include at least one private emergency services contact.

In still other embodiments, such as described above at least in the context of FIG. 4, a request for location information can be received. In response to the request for location information, the request for location information can be determined to be from a legitimate source. In response to determining that the request for location information is from the legitimate source, a location of the wearable computing device can be determined. A response to the request for location information can be sent, where the response includes the location.

In additional embodiments, such as discussed above in the context of at least FIGS. 4-5B, a request for location information about a requested party can be sent from a legitimate source for information requests of the requested party. A response to the request for location information can be received, where the response can include the location information about the requested party. The location information about the requested party can be displayed.

In some of these additional embodiments, such as discussed above in the context of at least FIGS. 5A and 5B, displaying the location information about the requested party can include displaying a map with the location information about the requested party.

In other of these additional embodiments, such as discussed above in the context of at least FIG. 4, a determination of whether the requested party is at an expected location can be made, based on a comparison of at least the location information about the requested party with expected location information. In response to determining that the requested party is not at the expected location, generating an alert that the requested party is not at the expected location.

In particular of these additional embodiments, such as discussed above in the context of at least FIG. 4, the comparison of the at least the location information about the requested party with the expected location information can include a comparison of the location information and a corresponding time with the expected location information.

In still additional embodiments, such as discussed above in the context of at least FIGS. 3A-3C, the wearable computing device can store the captured video data and added text. The stored video data and added text can be transmitted to the one or more emergency contacts.

In more additional embodiments, such as discussed above in the context of at least FIGS. 3A-3C, audio and video data can be received from the one or more emergency contacts during the experience sharing session.

CONCLUSION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method, comprising:
   determining, by a head-mountable device, a geographic location of the head-mountable device; and
   determining, by the head-mountable device, that the geographic location corresponds to a potential emergency location and responsively:
      receiving, by the head-mountable device, touch input via a touch pad arranged on a side-arm of the head-mountable device, wherein the touch input comprises one or more gestures that provide a confirmation that the potential emergency location corresponds to an emergency situation;
      in response to the confirmation, the head-mountable device initiating an experience sharing session with one or more emergency contacts; and
      during the experience sharing session, the head-mountable device capturing video data, adding text to the captured video data, and transmitting the captured video data and added text to the one or more emergency contacts.

2. The method of claim 1, wherein the head-mountable device receiving the touch input comprises the head-mountable device receiving user input.

3. The method of claim 1, further comprising:
   receiving voice input that indicates the emergency situation, wherein the voice input comprises a voice command.

4. The method of claim 1, further comprising:
   receiving a request for location information; and
   in response to the request for location information:
      determining whether the request for location information is from a legitimate source,
      in response to determining that the request for location information is from the legitimate source, determining a location of the head-mountable device, and
      sending a response to the request for location information, the response comprising the location.

5. The method of claim 1, further comprising:
   sending a request for location information about a requested party, the request sent from a legitimate source for information requests of the requested party;
   receiving a response to the request for location information, the response comprising the location information about the requested party; and
   displaying the location information about the requested party.

6. The method of claim 5, wherein displaying the location information about the requested party comprises displaying a map with the location information about the requested party.

7. The method of claim 6, further comprising:
   determining whether the requested party is at an expected location based on a comparison of at least the location information about the requested party with expected location information; and
   in response to determining that the requested party is not at the expected location, generating an alert that the requested party is not at the expected location.

8. The method of claim 7, wherein the comparison of the at least the location information about the requested party with the expected location information comprises a comparison of the location information and a corresponding time with the expected location information.

9. The method of claim 1, wherein the head-mountable device comprises a microphone, and wherein the method further comprises:
   during the experience sharing session, the head-mountable device capturing audio using the microphone and transmitting the captured audio to the one or more emergency contacts.

10. The method of claim 1, wherein the one or more emergency contacts include at least one public emergency services provider.

11. The method of claim 1, wherein the one or more emergency contacts include a private emergency services contact.

12. The method of claim 1, further comprising:
the head-mountable device storing the captured video data and added text; and
transmitting the stored video data and added text to the one or more emergency contacts.

13. The method of claim 1, further comprising:
during the experience sharing session, receiving audio and video data from the one or more emergency contacts.

14. A head-mountable device, comprising:
a processor;
a touch pad arranged on a side-arm of the head-mountable device; and
memory having one or more instructions that, in response to execution by the processor, causes the head-mountable device to perform functions comprising:
determine a geographic location of the head-mountable device; and
determine that the geographic location corresponds to a potential emergency location and responsively:
receive touch input via the touch pad, wherein the touch input comprises one or more gestures that provide a confirmation that the potential emergency location corresponds to an emergency situation;
in response to the confirmation, initiate an experience sharing session with one or more emergency contacts; and
during the experience sharing session, capture video data, add text to the captured video data, and transmit the captured video data and added text to the one or more emergency contacts.

15. The head-mountable device of claim 14, wherein the one or more instructions to receive the touch input comprise one or more instructions to receive user input comprising physical actuation of the touch pad.

16. The head-mountable device of claim 14, further comprising a biometric indication sensor that is configured to receive a biometric indication of the emergency situation.

17. The head-mountable device of claim 14, further comprising a location sensor, and wherein the functions further comprise:
obtain a location estimate, during the experience sharing session, for the head-mountable device using the location sensor; and
transmit the location estimate to at least one of the one or more emergency contacts using the wireless transceiver.

18. The head-mountable device of claim 14, further comprising a head-mounted display, and wherein the video camera is mounted on the head-mounted display.

19. An article of manufacture including a non-transitory computer-readable storage medium having instructions stored thereon that, in response to execution by a processor, cause the processor to perform operations, the instructions comprising:
instructions for determining a geographic location of a head-mountable device; and
instructions for determining that the geographic location corresponds to a potential emergency location and responsively:
receiving touch input via a touch pad arranged on a side-arm of the head-mountable device, wherein the touch input comprises one or more gestures that provide a confirmation that the potential emergency location corresponds to an emergency situation;
in response to the confirmation, initiating an experience sharing session with one or more emergency contacts; and
during the experience sharing session, capturing video data, adding text to the captured video data, and transmitting the captured video data and added text to the one or more emergency contacts.

20. An apparatus, comprising:
means for determining a geographic location of a head-mountable device; and
means for determining that the geographic location corresponds to a potential emergency location and responsively:
receiving touch input via a touch pad arranged on a side-arm of the head-mountable device;
determining that the touch input comprises one or more gestures that indicate an emergency situation, wherein the touch input comprises one or more gestures that provide a confirmation that the potential emergency location corresponds to an emergency situation;
in response to the confirmation, initiating an experience sharing session with one or more emergency contacts; and
during the experience sharing session, capturing video data, adding text to the captured video data, and transmitting the captured video data and added text to the one or more emergency contacts.

21. The method of claim 1, wherein the potential emergency location is predefined by a wearer of the head-mountable device.

22. The head-mountable device of claim 14, wherein the potential emergency location is predefined by a wearer of the head-mountable device.

23. The article of manufacture of claim 19, wherein the potential emergency location is predefined by a wearer of the head-mountable device.

24. The apparatus of claim 20, wherein the potential emergency location is predefined by a wearer of the head-mountable device.

* * * * *